(12) United States Patent
Blauch et al.

(10) Patent No.: US 6,761,220 B2
(45) Date of Patent: Jul. 13, 2004

(54) TREATMENT OF A WELL WITH AN ENCAPSULATED LIQUID AND PROCESS FOR ENCAPSULATING A LIQUID

(75) Inventors: Matthew E. Blauch, Duncan, OK (US); Juanita M. Cassidy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 138 days.

(21) Appl. No.: 10/062,342

(22) Filed: Feb. 1, 2002

(65) Prior Publication Data

US 2003/0196808 A1 Oct. 23, 2003

(51) Int. Cl.[7] .............................................. E21B 43/26
(52) U.S. Cl. ....................... 166/307; 166/308.2; 426/96
(58) Field of Search ............................... 166/307, 308, 166/308.1, 308.2; 426/89, 96, 97

(56) References Cited

U.S. PATENT DOCUMENTS

| | | | |
|---|---|---|---|
| 3,632,296 A | 1/1972 | Pandell .......................... 8/115.5 |
| 4,183,918 A | 1/1980 | Asher et al. ................... 424/94 |
| 4,660,645 A | 4/1987 | Newlove et al. ............. 166/304 |
| 4,713,251 A | 12/1987 | Seighman ..................... 426/96 |
| 4,741,401 A | 5/1988 | Walles et al. ................ 166/300 |
| 4,792,359 A | 12/1988 | Barrall et al. ................. 106/85 |
| 4,923,753 A | 5/1990 | Walles et al. ........... 428/402.24 |
| 4,986,354 A | 1/1991 | Cantu et al. ................. 166/279 |
| 5,102,559 A * | 4/1992 | McDougall et al. ..... 252/8.551 |
| 5,110,486 A | 5/1992 | Manalastas et al. ..... 252/8.551 |
| 5,164,099 A | 11/1992 | Gupta et al. .............. 252/8.551 |
| 5,373,901 A | 12/1994 | Norman et al. ............. 166/300 |
| 5,799,734 A | 9/1998 | Norman et al. ............. 166/278 |
| 5,922,652 A | 7/1999 | Kowalski et al. ........... 507/129 |
| 6,074,570 A | 6/2000 | Samonides .................... 216/83 |
| 6,207,620 B1 * | 3/2001 | Gonzalez et al. ........... 507/277 |
| 6,279,656 B1 | 8/2001 | Sinclair et al. ............. 166/310 |
| 6,280,767 B1 | 8/2001 | Sano et al. ................. 424/456 |
| 6,511,944 B2 * | 1/2003 | Taylor et al. ............... 507/237 |

FOREIGN PATENT DOCUMENTS

GB          2 273 484          6/1994          ............ B01J/13/02

* cited by examiner

Primary Examiner—William Neuder
(74) Attorney, Agent, or Firm—Robert A. Kent; C. Clark Dougherty, Jr.

(57) ABSTRACT

The present invention provides a method for encapsulating a liquid within a semi-permeable membrane. In particular, the present invention provides a method for encapsulating free flowing liquids. The current invention also provides a method for treating the downhole region of a well using encapsulated well treatment chemicals. The method of treating the downhole region of a well is particularly useful in acid etching a fracture face.

54 Claims, 2 Drawing Sheets

TREATMENT OF A WELL WITH AN ENCAPSULATED LIQUID AND PROCESS FOR ENCAPSULATING A LIQUID

BACKGROUND OF THE INVENTION

Hydrocarbon production typically requires a variety of chemical treatments. Normally injected downhole, the chemicals treat the producing formation or portions of the well. When injecting chemicals in the liquid state, the operator must compensate for dilution of the treatment chemicals by the carrier fluid. Further, certain well treatment chemicals, such as acids, require the use of additional safety procedures to protect on-site personnel and the environment.

Various chemicals and drugs are commonly encapsulated as a means for controlling the release of the encapsulated material. Current technology provides for the encapsulation of solids, gels/colloids and frozen liquids. Free flowing liquids such as water or mineral acids are not currently encapsulated in liquid form. Rather, encapsulation of free flowing liquids generally requires absorption of the liquid on a solid prior to encapsulation.

The invention disclosed herein provides a method for encapsulating free flowing fluids. In accordance with the invention, free flowing treatment chemicals are encapsulated to prevent dilution of the chemicals by the carrier fluid and to minimize safety and environmental issues. In addition, the inventive method allows placement of the well treatment chemicals at the desired downhole location without premature reaction or release of the chemicals.

The present invention is particularly useful for acid etching a fractured production zone. Following the fracturing of a production zone, well operators commonly acid etch the fracture face to enhance hydrocarbon production rates. The acid etching process involves injection of an acid downhole through the production pipe string into the fracture. Preferably, the acid penetrates the entire length of the fracture. Once in the fracture, the acid reacts with the fracture rock face creating channels in the rock face. Following the release of pressure on the fractured zone, the resulting channels provide a flow path thereby increasing the flow of hydrocarbons from the production zone to the borehole.

In accordance with the invention, the acid used in the etching process can be delivered in a safe, environmentally friendly and undiluted manner to the exact location where acid etching is desired. The invention achieves other advantages as well. For example, in prior art practices, the acid detrimentally impacts the pipe string and casing. Repeated acid treatments may require a "work over" or recompletion of the well to replace those portions of the pipe string damaged by the acid. Encapsulating the acid in accordance with the invention permits injection of the acid without exposing the pipe string to the corrosive effects of the acid. Further, for example, the encapsulated acid can be delivered deeply into the fracture prior to release.

The inventive well treatment process also improves the performance and economics of other well treatment chemicals. For example, encapsulation permits the controlled release of well treatment chemicals at a desired downhole location. Therefore, where the operator previously used a large quantity of chemicals to compensate for dilution or reaction during transport, the operator may now reduce the quantity of chemicals used. Thus, as an added benefit, the operator will conserve resources, save money and reduce the risk associated with handling chemicals at the well site.

SUMMARY OF THE INVENTION

The current invention provides a method of encapsulating a liquid within a semi-permeable membrane. The method first encapsulates solid material within a semi-permeable membrane to form a capsule. The capsule is placed in a liquid capable of passing through the membrane and dissolving the solid. The solid is allowed to dissolve in said liquid. The capsule remains in the liquid for a period of time sufficient to permit concentration gradient driving forces to displace substantially all dissolved solid from within the capsule. The resulting capsule contains primarily the liquid.

The current invention also provides an alternative method for encapsulating a liquid within a semi-permeable membrane. This method encapsulates a solid within a semi-permeable membrane to form a capsule. The capsule is placed in a first liquid capable of passing through the membrane and dissolving the solid. Subsequently, the capsule containing a solution of solid and first liquid is placed in contact with a second liquid. The concentration and/or volume of the second liquid contacting the capsule, in comparison to the volume of the solution within the capsule, creates an environment in which concentration gradient driving forces will remove substantially all of the solution of first liquid and solid from the capsule. As a result, the capsule contains primarily the second liquid.

The current invention also provides a method for treating a downhole region of a well with well treatment chemicals or additives. The method encapsulates a solid within a semi-permeable membrane to form a capsule. The capsule is placed in a liquid capable of passing through the semi-permeable membrane and dissolving the solid. The solid is allowed to dissolve in said liquid. The capsule remains in the liquid for a period of time sufficient to permit concentration gradient driving forces to displace substantially all dissolved solid from within the capsule. The resulting capsule contains primarily the liquid. The liquid containing capsule is placed downhole at a preselected point. Following positioning, the encapsulated liquid is released.

Additionally, the current invention provides an alternative method for treating the downhole region of a well. This method encapsulates a solid within a semi-permeable membrane to form a capsule. The capsule is placed in a first liquid capable of passing through the membrane and dissolving the solid. Subsequently, the capsule containing a solution of solid and first liquid is placed in contact with a second liquid. The concentration and/or volume of the second liquid contacting the capsule, in comparison to the volume of the solution within the capsule, creates an environment in which concentration gradient driving forces will remove substantially all of the solution of first liquid and solid from the capsule. As a result, the capsule contains primarily the second liquid. Following placement at the desired location, the second liquid is released from the capsules.

Further, the current invention provides a method for acid etching a fracture face located in a subterranean production zone. The method provides for hydraulically fracturing a subterranean formation to produce a fractured formation having at least one fracture face. After fracturing the formation, capsules of liquid acid are injected into the fractured formation while hydraulic pressure is maintained on the formation. Typically, a carrier fluid is used to transport the capsules downhole to the fractured formation. After the capsules are deposited in the fractured formation, hydraulic pressure is released from the formation. The drop in hydraulic pressure allows the formation to close on and crush the capsules thereby releasing the liquid acid. The acid subsequently reacts with and etches the fracture face.

DETAILED DISCLOSURE OF THE INVENTION

As used herein, the term "downhole region" includes the subsurface portion of the well bore, any subsurface production zones and the hardware associated with operating the well. The term "free flowing liquid" generally describes a substance in a liquid phase, capable of passing through a semi-permeable membrane. Examples of free flowing liquids include acids and water. The term "liquid" includes single component liquids as well as multi-component solutions.

I. Methods of Encapsulating a Liquid

The present invention provides methods for encapsulating free flowing fluids within a semi-permeable membrane. In general, this aspect of the invention provides a method for encapsulating fluids capable of passing through a semi-permeable membrane. A non-exclusive list of liquids suitable for encapsulation, according to the invention, includes: water, hydrochloric acid, sulfuric acid, phosphoric acid, nitric acid, formic acid, acetic acid, sulfamic acids, citric acid, glycolic acid, maleic acid, fumeric acid, alcohols, thiols, polyphosphonic acid, polyphosphonate, scale inhibitors, corrosion inhibitors, fertilizers, pharmaceuticals, detergents, cement retarders and accelerators, food additives, pesticides, dyes, pigments, paints, pheromones, dimethyl formamide, acetone, acetonitrile, ethers, perfumes, cross-linking agents and polymerization initiators.

Semi-permeable membranes suitable for use in the current invention may be formed from materials including but not limited to: partially to fully hydrogenated vegetable oil, such as tristearin, latex, gelatins, carageenans, polyethylene, polypropylene, polyisobutylene, a copolymer of vinyl chloride and vinylidene chloride, a copolymer of vinylidene chloride and an ester of an unsaturated carboxylic acid or a copolymer of ethylene and an unsaturated carboxylic acid.

The methods of the current invention use a solid encapsulated within a semi-permeable membrane as a starting material. A non-limiting list of solids suitable for use in the invention include: mineral salts such as sodium chloride and potassium chloride, calcium chloride, metal sulfates, metal nitrates, such as calcium nitrate and calcium sulfate, citric acid, powdered metals such as copper and aluminum, organic salts such as metal salts of carboxylic acids, citrates or formates, alcohols such as ethoxylated alcohols, mono-, di- and polysaccharides, sodium hydroxide, and ammonium bi-fluoride.

Processes for encapsulating solids are well known. For example, encapsulated solids suitable for use in the current invention are readily available from the Balchem Corporation, P.O. Box 175, Slate Hill, N.Y. 10973 (Balchem). Currently, Balchem markets encapsulated citric acid under the brand name CAP-SHURE®. Balchem markets several forms of CAP-SHURE® which are suitable for use in the current invention. Three versions currently available are CAP-SHURE® CITRIC ACID C-165-85, CAP-SHURE® CITRIC ACID C-165-63 and CAP-SHURE® CITRIC ACID C-150-50. Each product has a semi-permeable membrane formed from partially hydrogenated vegetable oil. The semi-permeable membrane has a melting point ranging from 59° C. to 70° C. In the C-165-85 product, the membrane comprises 13–17% by weight of the total capsule. The C-165-63 product has a membrane comprising 35–39% by weight of the total capsule and in the C-150-50, the membrane comprises 48–52% by weight of the total capsule. The C-165-85 has a particle size wherein no more than 2% of the particles are retained on a #20 mesh screen (USSS). The C-165-63 has a particle size wherein no more than 2% of the particles are retained on a #16 mesh screen (USSS). The C-150-50 has a particle size wherein no more than 2% of the particles are retained on a #10 mesh screen (USSS). Therefore, in each instance about 98% of the particles passed through the respective screen. Other encapsulated solids marketed by Balchem suitable for use in the current invention include sodium chloride and fumeric acid, marketed under the trade name Bakeshure FT.

Halliburton Company also markets encapsulated solids suitable for use as a starting material in the current invention including encapsulated solids marketed in association with the trade names "Optiflo II," "Optiflo III," "Optiflo HTE" and "Optiflo LT."

The process steps, materials and parameters necessary to provide the desired encapsulated liquid are as follows:

A. Solid/Liquid Exchange

One method for encapsulating a liquid according to the current invention comprises the steps of: 1) placing an encapsulated solid in the liquid to be encapsulated; 2) allowing the liquid to penetrate the semi-permeable membrane and subsequently dissolve the solid; and, 3) maintaining sufficient volume and concentration of the liquid to establish the concentration gradient necessary to drive substantially all of the solid from the interior of the capsule to the exterior. This method yields a capsule containing substantially only the liquid. Preferably, the final concentration of the liquid within the capsule will be greater than 50% of the concentration of the liquid used during the exchange process. For example, if a 30% HCl solution is used to dissolve the solid, then the capsule will contain a solution of at least 15% HCl.

The substantially complete transfer of solid from the interior to the exterior of the capsule is a result of concentration gradient driving forces. The principal of "concentration gradient driving forces" describes the transfer of atoms, ions and molecules across a semi-permeable membrane due to diffusion from a concentrated region to a substantially dilute region. This phenomenon is based on Fick's first law of diffusion described by the formula: $J=-X(\partial C/\partial x)$. In the formula, J is the movement or flux of a substance in the direction that eliminates the concentration gradient ($\partial C/\partial x$). The rate of the movement is proportional to the magnitude, X, of its gradient. Gradient diffusion can be described by osmosis or dialysis, depending on the size of the diffusing substance and the membrane pore size. Temperature, concentration gradient, diffusion constants, membrane thickness and membrane area will affect permeation and diffusion rates. In the current invention, the preferred volume of liquid on the exterior of the capsule is sufficiently large so as to dissolve and draw substantially all of the solids to the exterior of the capsule. If necessary to achieve complete exchange, multiple changes of the batch solution, large liquid to capsule volumes or continuous replacement of the desired liquid will move the exchange toward completion.

The time period and temperature necessary for each of the steps in the current invention will vary depending upon the solubility of the encapsulated solid, the porosity of the semi-permeable membrane, the concentration of the liquid and the temperature. In general, the temperature for carrying out the exchange may range from about room temperature to slightly lower than the melting point of the semi-permeable membrane. The time period necessary for the exchange can be calculated based on the temperature, the pore size of the membrane and the solubility parameter of the solid in the liquid.

In this embodiment of the current invention, the encapsulated solid must be soluble in the liquid to be encapsulated. Additionally, the encapsulating material must have a pore size sufficient to permit penetration by the liquid and transfer of the dissolved solid to the exterior of the capsule. Further, the concentration and/or volume of the liquid must be sufficient to permit concentration gradient driving forces to drive substantially all solid material to the exterior of the capsule. Finally, the temperature and time period necessary to complete the exchange of solid material for the liquid will vary depending on the composition of the solid material, the concentration and volume of the liquid and the pore size of the encapsulating material. One skilled in the art will have the requisite understanding of solubility parameters and semi-permeable membranes necessary to readily establish these operating parameters.

EXAMPLE 1

Single Step Encapsulation of a Mineral Acid

This example demonstrates the single step, solid/liquid exchange process for encapsulating a mineral acid. The process requires a solid, soluble in the desired mineral acid, as the encapsulated solid. In this case, an encapsulated citric acid marketed by Balchem under the trade name CAP-SHURE® provides an adequate starting material.

Twenty-two grams of CAP-SHURE® 165-85 and 75 grams of reagent grade hydrochloric acid ("HCl") (approximately 37.8%) were combined in a glass jar. Added to this mixture was 0.1 ml of Sperse-All-M dispersant available from the Halliburton Company. Following mixing, nearly all of the encapsulated citric acid material remained at the bottom of the jar. A few capsules floated after mixing; however, these capsules were likely damaged. After 16 days at room temperature, the majority of the capsules remained at the bottom of the jar. The capsules were filtered, rinsed with water and then rinsed with acetone. After drying, an attempt was made to squeeze the acid out of the capsules by applying mechanical force. Although the capsules were wet, insufficient liquid was produced for analysis. Therefore, individual capsules were placed on a calcite spar surface and crushed. Following crushing, production of $CO_2$ and fizzing were noted indicating the presence of acid. However, the lack of buoyancy indicates that the capsules were not likely filled with acid.

This Example demonstrates that the HCl will penetrate the encapsulating material and dissolve the citric acid. The concentration and/or volume of the hydrochloric acid contacting the encapsulated solid created an environment in which the concentration gradient favored elimination of the citric acid from the interior of the capsule.

EXAMPLE 2

Heating Improves the Exchange Efficiency in Single Step Exchange Process

This Example demonstrates the improved exchange efficiency achieved by heating the capsules during the exchange process.

19.6 grams of CAP-SHURE® C165-85, 0.1 ml of Sperse-All-M surfactant and 87.6 grams of HCl (reagent grade 36.63%) were combined in a glass jar. The resulting mixture was heated for three days at 52° C. (125° F.). At the end of three days, approximately 50% of the capsules were floating. The floating capsules were decanted, isolated using a büchner funnel, washed with distilled water, washed with acetone and allowed to air dry. After drying, the capsules were placed in a 5 cc glass syringe and the liquid was mechanically forced out of the capsules by crushing. The final concentration of HCl removed from the capsules was 23.85%. Thus, the capsules contained 65% of the HCl present in the initial HCl solution.

This Example demonstrates that heating the capsules enhances the dissolution of the citric acid in the HCl and improves the exchange rate. Although the concentration of HCl within the capsule has been reduced, the concentration is sufficient for downhole applications such as acid etching of a fracture face.

EXAMPLE 3

Single Step Encapsulation of a Corrosion Inhibitor

Figure 1:
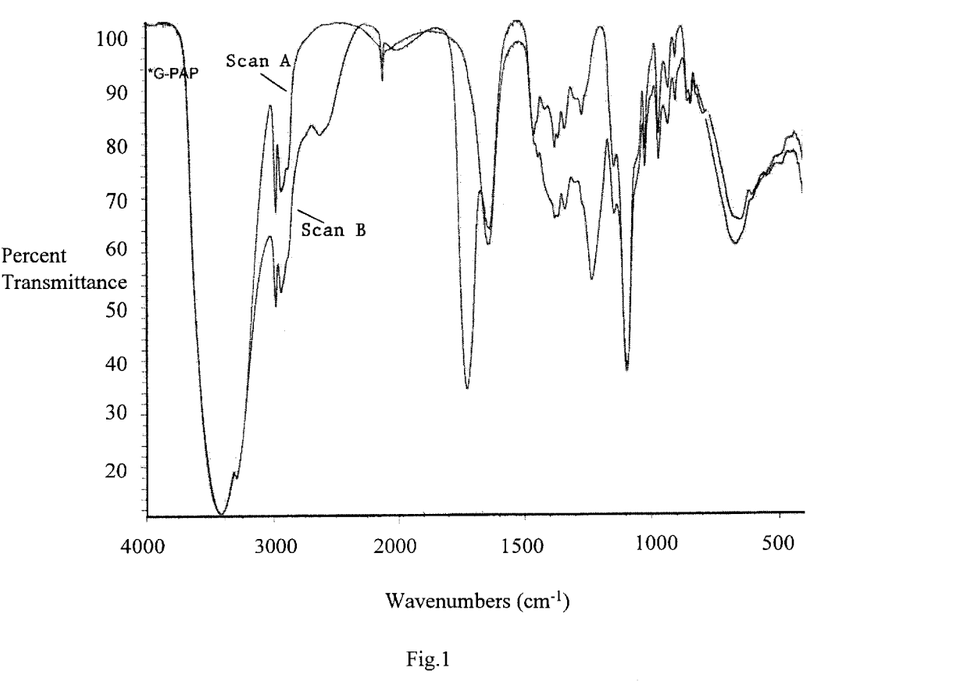
FIG. 1 is an FTIR scan of unused Golpanol PAP and a scan of the fluid obtained from the capsules of Example 3.

Twenty-one grams of CAP-SHURE® C. 165-85 and 38.4 grams of a propargyl alcohol propoxylated, were combined in a glass jar. Propargyl alcohol propoxylated (CAS number 7732-18-5) is a corrosion inhibitor available from BASF under the trade name Golpanol PAP. Initially, the capsules remained at the bottom of the jar. After standing at room temperature for 17 days, the buoyant capsules were isolated using a büchner funnel, washed with acetone and dried. The dried capsules were placed in a 5 cc glass syringe and crushed with the plunger. After crushing, a light yellow fluid was collected and analyzed using FTIR analysis. For comparison, an unused Golpanol PAP sample (dark yellow) was also analyzed using FTIR analysis. FIG. 1, Scan A is the scan generated by the unused sample of Golpanol PAP and FIG. 1, Scan B is the scan generated by the fluid obtained from the capsules. A comparison of the FTIR scans indicates that fluid obtained from the capsules is Golpanol PAP. The extra peaks found at approximately 2070 and 1727 $cm^{-1}$ in Scan B are possibly due to encapsulant.

Thus, the current invention provides a suitable mechanism for encapsulating organic compounds useful as corrosion inhibitors.

While the foregoing examples describe the encapsulation of a mineral acid and a corrosion inhibitor, the inventive process will work equally well with any solid/liquid system in which the solid is soluble in the liquid and in which the solution of dissolved solid in the desired liquid will pass through the semi-permeable membrane. For example, citric acid is also soluble in a solution of phosphonic acids or esters such as polyphosphonic acid or polyphosphonate, common well treatment chemicals used to prevent the precipitation of scale on the interior walls of a pipe string. Therefore, the foregoing method will be able to produce capsules containing polyphosphonic acid or polyphosphonate. The variables of temperature and treatment time will vary depending on the encapsulated solid, the desired liquid and the pore size of the encapsulating material; however, one familiar with the dissolution rates of the solid in the liquid will readily determine the proper operating conditions with only minimal experimentation.

B. Solid/Liquid Exchange & Liquid/Liquid Exchange

An alternative embodiment of the current invention comprises the steps of: 1) placing an encapsulated solid in a first liquid capable of dissolving the solid; 2) allowing the first liquid to dissolve the solid; 3) placing the capsules containing the solution of first liquid and solid in a second liquid;

and 4) maintaining sufficient volume and/or concentration of the liquid to establish the concentration gradient necessary to drive substantially all of the solid from the interior of the capsule to the exterior. The resulting product is a capsule containing substantially only the second liquid.

In this process, the initial liquid can be, for example, water, hydrochloric acid, sulfuric acid, phosphoric acid, nitric acid, formic acid, acetic acid, sulfamic acids, citric acid, glycolic acid, maleic acid, fumeric acid, corrosion inhibitors, scale inhibitors, fertilizers, pharmaceuticals, detergents, cement retarders and accelerators, food additives, pesticides, dyes, pigments, paints, pheromones and perfumes.

The second liquid used in step 3) will vary depending on the initial fluid. In general, the second liquid may include, for example: water, hydrochloric acid, sulfuric acid, phosphoric acid, nitric acid, formic acid, acetic acid, sulfamic acids, citric acid, glycolic acid, maleic acid, fumeric acid, alcohols, thiols, polyphosphonic acid, polyphosphonate, scale inhibitors, corrosion inhibitors, fertilizers, pharmaceuticals, detergents, cement retarders and accelerators, food additives, pesticides, dyes, pigments, paints, pheromones, dimethyl formamide, acetone, acetonitrile, ethers, perfumes, cross-linking agents and polymerization initiators. The term polymerization initiators includes, but is not limited to peroxides such as benzoyl peroxide, Lewis acids and nitrites compounds. Cross-linking agents includes compounds such as titanates, borates and zirconates as commonly used in the art.

In accordance with this embodiment, step 2) can be stopped prior to removing substantially all solid from the capsule. Preferably, step 2) proceeds at least until the resulting solution reaches equilibrium between the solid and the first liquid. The capsule containing a solution of the first liquid and dissolved solid will be transferred to the second liquid. However, if an undesirable reaction may occur between the second liquid and the solid, step 2) may be allowed to progress to the point where concentration gradient driving forces have removed substantially all of the solid from the capsule.

As in the solid/liquid exchange described in connection with the first embodiment set forth above, the time period and temperature necessary for each of the above steps will vary depending upon the solubility of the encapsulated solid, the porosity of the semi-permeable membrane, the concentration of the liquid, the temperature and the concentration of the second liquid. In general, the temperature for carrying out the exchange may range from about room temperature to slightly lower than the melting point of the semi-permeable membrane. For the solid/liquid exchange, the requisite time period can be calculated based on the temperature, the pore size of the membrane and the solubility parameter of the solid in the liquid. The time period necessary for the liquid/liquid exchange can be calculated based on the temperature, pore size, diffusion rate, concentration gradient and the partition coefficients of the two liquids. Further, if necessary to achieve complete exchange, multiple changes of the batch solution, large liquid to capsule volumes or continuous replacement of desired liquid will move the exchange toward completion.

One advantage of this particular embodiment of the invention is the ability to encapsulate a liquid incapable of dissolving the encapsulated solid. In such instances, the first liquid is chosen for its ability to dissolve the solid and its miscibility with the second liquid. When using water as the first liquid, this process also permits recovery and recycling of the solid from the first liquid. Another advantage of the liquid/liquid exchange process is the ability to decouple the first exchange step from the second exchange step in time and space. Another advantage of the liquid/liquid process is a reduction in overall time to provide the desired encapsulated liquid as compared to the single liquid process.

EXAMPLE 4

Two Step Exchange of Citric Acid for Methanol

Citric acid has a low solubility constant in methanol. Therefore, a solid/liquid exchange of methanol for citric acid will take an inordinate amount of time and may not result in complete exchange of methanol for citric acid. To obtain encapsulated methanol, the preferred method will be the solid/liquid & liquid/liquid exchange process of the current invention. As is well known, citric acid is very soluble in water and methanol is miscible with water. Therefore, the solid/liquid & liquid/liquid exchange method of the current invention will provide a mechanism for encapsulating methanol in a reasonable period of time.

Figure 2:
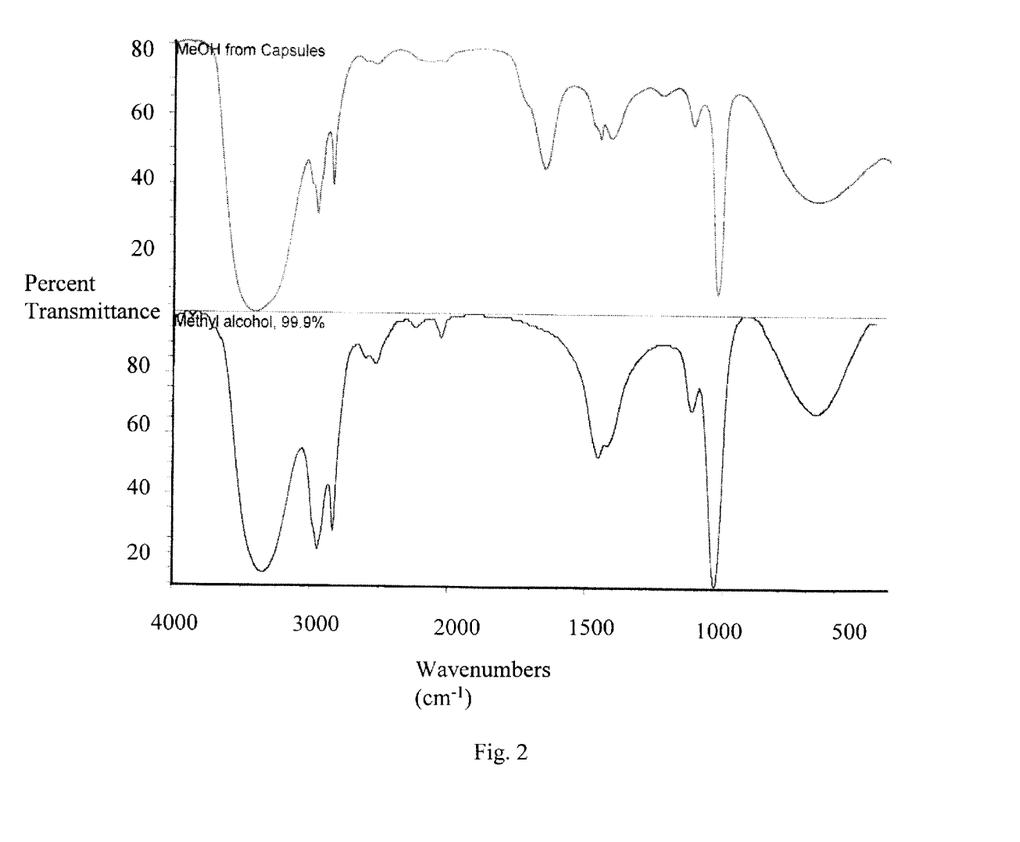
FIG. 2 is an infrared analysis of the fluid obtained from the capsules of Example 4.

Capsules containing citric acid (CAP-SHURE® C 165-85) were initially immersed in water at room temperature for a period of time sufficient to completely exchange the citric acid for water. Approximately 10 ml of water filled capsules, by volume, were placed in a 250 ml graduated cylinder containing methanol. The level of methanol was brought up to the 250 ml mark in the graduated cylinder. A layer of presumably defective capsules rose to the surface of the methanol. The majority of the capsules remained at the bottom of the cylinder. Over the next 24 hours, the graduated cylinder was periodically inverted. After approximately 24 hours, some of the capsules were decanted and isolated using a büchner funnel. The separated capsules were rinsed with acetone and air-dried. The fluid removed from the capsules was analyzed using infrared analysis. The resulting scan, provided in FIG. 2, correlates well with reagent grade methanol except for some additional water peaks. These peaks likely resulted from trace concentrations of water remaining in the capsules.

EXAMPLE 5

Two Step Exchange of Citric Acid for Hydrochloric Acid

The following is an example of the solid/liquid exchange & liquid/liquid exchange process for producing a capsule containing HCl.

Solid citric acid encapsulated in hydrogenated vegetable oil was obtained from Balchem. A sufficient quantity of capsules was placed in tap water to form a slurry. The slurry was maintained for several days until reaching equilibrium as evidenced by the capsules having a density less than that of the aqueous phase. Heating the slurry accelerated the equilibration process; however, the heating step may be omitted. The resulting water containing capsules were transferred to a solution of concentrated HCl (31.45%). The capsules were maintained in the concentrated HCl for 24 hours. Upon removal from the HCl, the capsules were washed with deionized water and dried. When ruptured on a calcite spar surface, the released fluid was observed to react with the calcite spar thereby demonstrating the encapsulation of the HCl. As a control, capsules obtained from the water slurry prior to transfer to the HCl were also ruptured to release the contained fluid on the calcite spar surface. The fluid released from these capsules did not react with the calcite spar.

II. Methods of Chemically Treating a Downhole Region of a Well

The present invention also provides improved methods for chemically treating a downhole region of a well. A non-exclusive list of common well treatment chemicals and additives includes: acid etching agents, scale inhibitors, corrosion inhibitors, biocides, paraffin and asphaltene inhibitors, $H_2S$ scavengers, oxygen scavengers, demulsifiers, clay stabilizers; surfactants, acidizing agents and mixtures thereof. The controlled downhole release of these chemicals will significantly improve their functionality.

The process of chemically treating a well according to the current invention entails encapsulating the desired well treatment chemicals according to one of the methods described in the preceding section of this disclosure. Following encapsulation, the capsules of well treatment chemicals are blended into a carrier fluid capable of transporting the capsules to a desired location downhole. Carrier fluids suitable for use in the current invention include fracturing fluids as well as acidizing fluids, gelled or non-gelled fluids, gravel pack fluids, completion fluids and work over fluids. The methods currently used for blending solids and slurries at the wellhead will provide satisfactory blending of the capsules and the carrier fluid. For example, devices such as slurry processors and blenders are suitable for blending the capsules into a carrier fluid. Blending will typically be achieved by feeding the capsules to the blender or processor by means of an auger feed or from a liquid storage tank containing a slurry of capsules. If desired, capsules may be suspended in either a gel carrier or an inert fluid designed to prevent settling. To ensure a consistent concentration of capsules throughout the gel or inert fluid, the specific gravity of the gel or inert fluid should approximate the specific gravity of the capsules. Alternatively, the capsules may also be suspended via mechanical agitation in a pre-blender familiar to those skilled in the art of hydraulic fracturing.

In practice, a slurry processor or blender uses a gallinger pump for the suction end. The capsules enter the gallinger pump via either the auger system or holding tank. Upon blending with the fracturing gel or other fluid, the final slurry enters the low pressure suction side of the high pressure pump grid and exits via high pressure discharge lines connected to the wellhead assembly.

U.S. Pat. No. 5,799,734, incorporated herein by reference, discloses a method for preparing a slurry containing particulate matter such as resin coated sand, glass bead, ceramic particles and the like. The method disclosed by the '734 patent will also provide a satisfactory means for preparing a slurry of encapsulated liquid.

After blending into a carrier fluid, the capsules are injected downhole to a desired location in the well. Those skilled in the art of well treatment are familiar with the techniques used for injecting particulates and chemicals into the desired portion of a well. For example, a typical fracturing process first positions a spacer in the pipe string just below the fractured formation. After positioning of the spacer, fracturing fluid is pumped at fracturing rates into the target formation. The spacer acts to initiate the fracture by focusing fluid pressure on the desired formation. Following fracturing of the formation, acid etching of the fracture typically takes place. Thus, a carrier fluid containing the acid filled capsules would then be initiated to the well. During injection of the acid containing capsules, the hydraulic fracture will likely continue to grow. Preferably, the capsules will travel the length of the fracture. Leak off of the non-acid carrier fluid into the rock fractures and pores concentrates the capsules where they are needed for pinpoint reaction. In this manner, the reaction occurs where it is most needed.

In the acid etching process, release of the encapsulated acid occurs after positioning the capsules at the desired location. Acids suitable for encapsulation and acid etching include but are not limited to hydrochloric acid, nitric acid, sulfuric acid and mixtures thereof. Typically, in the case of acid etching, release of the acid from the capsules occurs when hydraulic pressure is removed from the fracture. Upon removal of hydraulic pressure from the fracture, the fracture will close and crush the capsules. The released acid reacts with the fracture face forming channels. These channels provide the passages necessary to increase the production of hydrocarbons from the producing formation.

Isolation of the encapsulated fluid from the carrier fluid and the downhole environment by the inventive encapsulation process provides several advantages. For example, using encapsulated well treatment chemicals permits blending of normally incompatible compounds in the carrier fluid. Thus, the present invention permits the transport of an acid compound to a downhole environment by a carrier fluid having a neutral or basic pH without detrimentally impacting either the carrier fluid or the acid. Further, the present invention provides a mechanism for carrying out a chemical reaction in the downhole environment between two liquid compounds. Specifically, one or more of the compounds can be separately encapsulated and placed in the carrier fluid. Following placement of the liquids downhole, the liquids are then released from the capsules and allowed to react.

Additionally, the inventive method provides a means for transporting the well treatment chemicals to the desired location without dilution by the carrier fluid. As an added benefit, when transporting corrosive chemicals such as mineral acids, the carrier fluid will behave as a non-acid. Viscosity enhancing agents and/or other additives may be added to the carrier fluid without reducing the concentration of the well treatment chemicals or additives. As an added benefit, when transporting corrosive chemicals such as mineral acids, the carrier fluid will behave as a non-acid. Thus, the current invention enhances the economic usage of the specific target chemical or acid.

A non-limiting list of mechanisms suitable for releasing the encapsulated fluid includes: a change in pH, crushing, rupture, dissolution of the semi-permeable membrane, diffusion and/or thermal melting of the encapsulating membrane. For example, acid etching of a fracture face typically follows formation fracturing. Preferably, the acid containing capsules will be injected into the formation with the fracturing fluid. This process places the acid in direct contact with the fracture face. Upon removal of hydraulic pressure from the fracture, the fracture will close and crush the capsules. The released acid reacts with the fracture face forming channels. These channels provide the passages necessary to increase the production of hydrocarbons from the producing formation. When thermal release of the fluid is desired, a fracture cool down model is prepared to design or predict thermal cool down effects and effective depth of transport prior to achieving thermal release of the liquid. In a diffusive release mode, plots of the fraction release vs. time provide the release rates needed to calculate pump rate, pump time or shut-in period to achieve the desired liquid release point

EXAMPLE 6

Acid Etching a Well Fracture With Encapsulated Acid

The method of injecting an acid containing capsule and acid etching a well fracture will be discussed to exemplify the current invention. While the following discussion focuses on acid etching, the method of injecting well treatment chemicals and additives is not limited to the injection of an acid.

Acid etching a well fracture according to the current invention requires an acid encapsulated within a semi-permeable membrane. The previously described processes will produce capsules containing a suitable acid such as HCl.

The encapsulation of HCl according to the methods described herein may take place either at the well location or off-site. In either case, following encapsulation, the operator blends the encapsulated HCl with the desired carrier fluid prior to injection downhole. If desired, surfactants may be added to aid in dispersing and carrying the capsules. Alternatively foamed or gelled fluids may also be used to transport capsules.

Due to the isolation of the HCl from the carrier fluid, additional components may be added, as necessary, to ensure complete transport of the HCl through the length of the fracture to be acid etched. For example, addition of viscosity enhancers will increase the viscosity of the carrier fluid and will improve pumpability. Improved pumpability will promote transport of the capsules to the end of the fracture. Alternatively, the carrier fluid may also double as the fracturing fluid. In either case, despite the high concentration of acid dispersed therein, the carrier fluid will act as a non-acid and will generally have a pH between about 4 and about 11.5.

Following transport to the desired downhole location, the operator releases the HCl by any of several methods including but not limited to: releasing pressure on the fracture causing it to close and crush the capsule; dissolution of the semi-permeable membrane by other downhole chemicals; dissolution or rupture of the membrane due to a change in pH; changing the downhole static pressure leading to rupture of the membrane; diffusion; and/or, melting of the encapsulating membrane. Upon release, the acid will react with the fracture face to create additional channels and passages for oil production.

While the present invention has been described with regard to the examples, other embodiments of the current invention will be apparent to those skilled in the art. Thus, the foregoing specification is considered exemplary with the true scope and spirit of the invention being indicated by the following claims.

We claim:

1. A method for encapsulating a liquid comprising:
   a) encapsulating a solid within a semi-permeable membrane to form a capsule;
   b) placing said capsule in a liquid capable of dissolving said solid whereby said liquid passes through said semi-permeable membrane and dissolves said solid;
   c) maintaining said capsule in said liquid for a period of time sufficient to permit concentration gradient driving forces to cause said liquid to displace said solid from within said capsule such that substantially all of said solid is removed from said capsule leaving said liquid in said capsule.

2. The method of claim 1, wherein said semi-permeable membrane is formed from a compound selected from the group consisting of partially and fully hydrogenated vegetable oil, latex, gelatins, carageenans, homopolymer or copolymer of ethylene, propylene, isobutylene, vinyl chloride, and vinylidene chloride.

3. The method of claim 1, wherein said semi-permeable membrane is formed from a compound selected from the group consisting of partially and fully hydrogenated vegetable oil, latex, gelatins, and carageenans.

4. The method of claim 1 wherein said semi-permeable membrane is formed from a polymer selected from the group consisting of tristearin, polyethylene, polypropylene, polyisobutylene, a copolymer of vinyl chloride and vinylidene chloride, a copolymer of vinylidene chloride and an ester of an unsaturated carboxylic acid or a copolymer of ethylene and an unsaturated carboxylic acid.

5. The method of claim 1 wherein said semi-permeable membrane is formed from a polymer selected from the group consisting of tristearin, polyethylene, polypropylene, and polyisobutylene.

6. The method of claim 1 wherein said semi-permeable membrane is formed from tristearin.

7. The method of claim 1, wherein said solid is selected from the group consisting of organic acids, inorganic acids, alcohols, powdered metals, ethoxylated alcohols, monosaccharides, disaccharides, NaOH, ammonium bi-fluoride, salts of organic acids and salts of mineral acids.

8. The method of claim 1, wherein said solid is selected from the group consisting of organic acids, NaOH, ammonium bi-fluoride, salts of organic acids and salts of mineral acids.

9. The method of claim 1, wherein said solid is selected from the group consisting of citric acid, potassium chloride, ammonium bi-fluoride and sodium chloride.

10. The method of claim 1, wherein said liquid is selected from the group consisting of water, hydrochloric acid, sulfuric acid, phosphoric acid, nitric acid, formic acid, acetic acid, sulfamic acids, citric acid, glycolic acid, maleic acid, fumeric acid, alcohols, thiols, polyphosphonic acid, polyphosphonate, scale inhibitors, corrosion inhibitors, fertilizers, pharmaceuticals, detergents, cement retarders and accelerators, biocides, paraffin inhibitors, asphaltene inhibitors, hydrogen sulfide scavengers, oxygen scavengers, demulsifiers, clay stabilizers, surfactants, food additives, pesticides, dyes, pigments, paints, pheromones, dimethyl formamide, acetone, acetonitrile, ethers, perfumes, cross-linking agents, polymerization initiators and mixtures thereof.

11. The method of claim 1, wherein said liquid is selected from the group consisting of water, hydrochloric acid, sulfuric acid, phosphoric acid, nitric acid, scale inhibitors and corrosion inhibitors mixtures therefore.

12. The method of claim 1, wherein said liquid is hydrochloric acid.

13. A method for encapsulating a liquid comprising:
   a) encapsulating a solid within a semi-permeable membrane to form a capsule;
   b) placing said capsule in a first liquid capable of passing through said semi-permeable membrane and capable of dissolving said solid whereby said liquid passes through said semi-permeable membrane and dissolves said solid;
   c) placing the encapsulated solution of solid and first liquid in contact with a second liquid;
   d) maintaining said capsule in contact with said second liquid for a period of time sufficient to permit concentration gradient driving forces to cause said second liquid to displace substantially all of said solution of solid and first liquid from within said capsule thereby producing a capsule containing primarily said second liquid.

14. The method of claim 13, wherein said semi-permeable membrane is formed from a compound selected from the group consisting of vegetable oil, latex, gelatins, carageenans, homopolymer or copolymer of ethylene, propylene, isobutylene, vinyl chloride, and vinylidene chloride.

15. The method of claim 13, wherein said semi-permeable membrane is formed from a compound selected from the group consisting of partially and fully hydrogenated vegetable oil, latex, gelatins, and carageenans.

16. (original) The method of claim 13 wherein the semi-permeable membrane is formed from a polymer selected from the group consisting of tristearin, polyethylene, polypropylene, polyisobutylene, a copolymer of vinyl chloride and vinylidene chloride, a copolymer of vinylidene chloride and an ester of an unsaturated carboxylic acid or a copolymer of ethylene and an unsaturated carboxylic acid.

17. The method of claim 13, wherein said semi-permeable membrane is formed from a polymer selected from the group consisting of tristearin, polyethylene, polypropylene, and polyisobutylene.

18. The method of claim 13, wherein said semi-permeable membrane is formed from tristearin.

19. The method of claim 13, wherein said solid is selected from the group consisting of organic acids, inorganic acids, alcohols, powdered metal, ethoxylated alcohols, monosaccharides, disaccharides, NaOH, ammonium bi-fluoride, salts of organic acids and salts of mineral acids.

20. The method of claim 13, wherein said solid is selected from the group consisting of organic acids, NaOH, ammonium bi-fluoride, salts of organic acids and salts of mineral acids.

21. The method of claim 13, wherein said solid is selected from the group consisting of citric acid, potassium chloride, ammonium bi-fluoride and sodium chloride.

22. The method of claim 13, wherein said solid is water-soluble.

23. The method of claim 13, wherein said first liquid is selected from the group consisting of water, hydrochloric acid, sulfuric acid, phosphoric acid, nitric acid, formic acid, acetic acid, sulfamic acids, citric acid, glycolic acid, maleic acid, fumeric acid, corrosion inhibitors, scale inhibitors, fertilizers, pharmaceuticals, detergents, cement retarders and accelerators, food additives, pesticides, dyes, pigments, paints, pheromones and perfumes and mixtures thereof and
   said second liquid is selected from the group consisting of water, hydrochloric acid, sulfuric acid, phosphoric acid, nitric acid, formic acid, acetic acid, sulfamic acids, citric acid, glycolic acid, maleic acid, fumeric acid, alcohols, thiols, polyphosphonic acid, polyphosphonate, scale inhibitors, corrosion inhibitors, fertilizers, pharmaceuticals, detergents, cement retarders and accelerators, food additives, pesticides, dyes, pigments, paints, pheromones, dimethyl formamide, acetone, acetonitrile, ethers, perfumes, cross-linking agents and polymerization initiators and mixtures thereof.

24. The method of claim 13, wherein said first and second liquids are selected from the group consisting of water, hydrochloric acid, sulfuric acid, phosphoric acid, nitric acid, scale inhibitors and corrosion inhibitors and mixtures thereof.

25. The method of claim 13, wherein said first liquid is water and said second liquid is hydrochloric acid.

26. The method of claim 13, wherein the concentration of said second liquid in said capsule is at least 50% of the concentration of said second liquid initially used in step c).

27. The method of claim 13, wherein said solid and said liquid reach a state of equilibrium in step (b) before step c) is carried out.

28. The method of claim 13, wherein said liquid replaces substantially all of said solid in step (b) before step (c) is carried out.

29. A method for treating the downhole region of a well comprising:
   a) encapsulating a solid within a semi-permeable membrane to form a capsule;
   b) placing said capsule in a liquid capable of dissolving said solid whereby said liquid passes through said semi-permeable membrane and dissolves said solid;
   c) maintaining said capsule in said liquid for a period of time sufficient to permit concentration gradient driving forces to cause said liquid to displace said solid from within said capsule such that substantially all of said solid is removed from said capsule leaving said liquid in said capsule;
   d) placing said capsule within the downhole region of a well; and,
   e) releasing said solution from said capsule.

30. The method of claim 29, wherein said liquid is released from said capsule by a mechanism selected from the group consisting of crushing said capsule, rupturing said capsule, dissolving said capsule, diffusion of said solution out of said capsule or melting of the encapsulating membrane.

31. The method of claim 29, wherein said capsule is released from said solution by crushing said capsule between the faces of a fractured production zone.

32. The method of claim 29, step e), wherein said capsule is placed within a well fracture.

33. The method of claim 29, wherein the semi-permeable membrane is formed from a polymer selected from the group consisting of tristearin, polyethylene, polypropylene, polyisobutylene, a copolymer of vinyl chloride and vinylidene chloride, a copolymer of vinylidene chloride and an ester of an unsaturated carboxylic acid or a copolymer of ethylene and an unsaturated carboxylic acid.

34. The method of claim 29, wherein said solid is selected from the group consisting of organic acids, inorganic acids, alcohols, powdered metals, ethoxylated alcohols, monosaccharides, disaccharides, NaOH, ammonium bi-fluoride, salts of organic acids and salts of mineral acids.

35. The method of claim 29, wherein said liquid is selected from the group consisting of water, hydrochloric acid, sulfuric acid, phosphoric acid, nitric acid, formic acid, acetic acid, sulfamic acids, citric acid, glycolic acid, maleic acid, fumeric acid, alcohols, thiols, polyphosphonic acid, polyphosphonate, scale inhibitors, corrosion inhibitors, biocides, paraffin inhibitors, asphaltene inhibitors, hydrogen sulfide scavengers, oxygen scavengers, demulsifiers, clay stabilizers, surfactants, dimethyl formamide, acetone, acetonitrile, ethers, cross-linking agents, polymerization initiators and mixtures thereof.

36. A method for treating the downhole region of a well comprising:
   a) encapsulating a solid within a semi-permeable membrane to form a capsule;
   b) placing said capsule in a first liquid capable of passing through said semi-permeable membrane and capable of dissolving said solid whereby said liquid passes through said semi-permeable membrane and dissolves at least a portion of said solid;
   c) placing the encapsulated solution of solid and first liquid in contact with a second liquid;
   d) maintaining said capsule in contact with said second liquid for a period of time sufficient to permit concentration gradient driving forces to cause said second liquid to displace substantially all of said solution of solid and first liquid from within said capsule thereby producing a capsule containing primarily said second liquid.

e) placing said capsule within the downhole region of a well; and, f) releasing said second liquid from said capsule.

37. The method of claim 36, wherein the concentration of said second liquid in said capsule is at least 50% of the concentration of said second liquid used to replace said first liquid.

38. The method of claim 36 step c), wherein said solid and said liquid reach a state of equilibrium prior to proceeding to step d).

39. The method of claim 36 step c), wherein said first liquid replaces substantially all of said solid prior to proceeding to step d).

40. The method of claim 36, wherein said liquid is released from said capsule by a mechanism selected from the group consisting of crushing said capsule, rupturing said capsule, dissolving said capsule, diffusion of said solution out of said capsule or melting of the encapsulating membrane.

41. The method of claim 36, wherein said liquid is released from said capsule by crushing said capsule between the faces of a fractured production zone.

42. The method of claim 36, step e), wherein said capsule is placed within a well fracture.

43. The method of claim 36, wherein step f), is achieved by a mechanism selected from the group consisting of crushing said capsule, rupturing said capsule, dissolving said capsule, diffusion of said solution out of said capsule or melting of the encapsulating membrane.

44. The method of claim 36, wherein said semi-permeable membrane is formed from a compound selected from the group consisting of vegetable oil, latex, gelatins, carageenans, homopolymer or copolymer of ethylene, propylene, isobutylene, vinyl chloride, and vinylidene chloride.

45. The method of claim 36, wherein the semi-permeable membrane is formed from a polymer selected from the group consisting of tristearin, polyethylene, polypropylene, polyisobutylene, a copolymer of vinyl chloride and vinylidene chloride, a copolymer of vinylidene chloride and an ester of an unsaturated carboxylic acid or a copolymer of ethylene and an unsaturated carboxylic acid.

46. The method of claim 36, wherein said solid is selected from the group consisting of organic acids, inorganic acids, alcohols, powdered metals, ethoxylated alcohols, monosaccharides, disaccharides, NaOH, ammonium hi-fluoride, salts of organic acids and salts of mineral acids.

47. The method of claim 36, wherein said first liquid is selected from the group consisting of water, hydrochloric acid, sulfuric acid, phosphoric acid, nitric acid, formic acid, acetic acid, sulfamic acids, citric acid, glycolic acid, maleic acid, fumeric acid, corrosion inhibitors, scale inhibitors, fertilizers, pharmaceuticals, detergents, cement retarders and accelerators, food additives, pesticides, dyes, pigments, paints, pheromones and perfumes.

48. The method of claim 36, wherein said second liquid is selected from the group consisting of water, hydrochloric acid, sulfuric acid, phosphoric acid, nitric acid, formic acid, acetic acid, sulfamic acids, citric acid, glycolic acid, maleic acid, fumeric acid, alcohols, thiols, polyphosphonic acid, polyphosphonate, scale inhibitors, corrosion inhibitors, fertilizers, pharmaceuticals, detergents, cement retarders and accelerators, food additives, pesticides, dyes, pigments, paints, pheromones, dimethyl formamide, acetone, acetonitrile, ethers, perfumes, cross-linking agents and polymerization initiators and mixtures thereof.

49. A method for acid etching a fracture face located in a subterranean production zone comprising the steps of:

a) hydraulically fracturing a subterranean formation to produce a fractured formation having at least one fracture face;

b) injecting capsules containing a liquid acid into said fractured formation while maintaining hydraulic pressure on said fractured formation said capsules being prepared by (i) encapsulating a solid within a semi-permeable membrane to form a capsule: (ii) placing said capsule in a liquid capable of dissolving said solid whereby said liquid passes through said semi-permeable membrane and dissolves at least a portion of said solid: (iii) maintaining said capsule in said liquid for a period of time sufficient to permit concentration gradient driving forces to cause said liquid to displace said solid from within said capsule such that at least a portion of said solid is removed from said capsule leaving said liquid in said capsule;

c) depositing said capsules in said fractured formation; and, d) releasing said acid from said capsules thereby acid etching said fracture face.

50. The method of claim 49, wherein said step of releasing said acid is carried out by removing hydraulic pressure from said fractured formation thereby allowing said fractured formation to close and crush said capsules.

51. The process of claim 49, wherein said acid is selected from the group of hydrochloric acid, sulfuric acid, nitric acid and mixtures thereof.

52. The process of claim 49, further comprising the step of blending said capsules in a carrier fluid having approximately the same specific gravity as said capsules prior to injecting said capsules into said fractured formation.

53. The process of claim 52, wherein said carrier fluid has a pH between about 4 to about 11.5.

54. The process of claim 52, wherein said carrier fluid has a pH of about 7 to about 11.5.

* * * * *